US012525013B1

(12) United States Patent
Alokhina et al.

(10) Patent No.: US 12,525,013 B1
(45) Date of Patent: Jan. 13, 2026

(54) PRELABELING OF BOUNDING BOXES IN VIDEO FRAMES

(71) Applicant: Scale AI, Inc., San Francisco, CA (US)

(72) Inventors: Anastasiia Alokhina, San Francisco, CA (US); Chiao-Lun Cheng, Taipei (TW); Andrew Liu, San Francisco, CA (US)

(73) Assignee: Scale AI, Inc., San Francisco, CA (US)

( * ) Notice: Subject to any disclaimer, the term of this patent is extended or adjusted under 35 U.S.C. 154(b) by 0 days.

(21) Appl. No.: 18/499,145

(22) Filed: Oct. 31, 2023

Related U.S. Application Data

(62) Division of application No. 17/013,448, filed on Sep. 4, 2020, now Pat. No. 11,804,042.

(51) Int. Cl.
*G06V 20/40* (2022.01)
*G06F 18/214* (2023.01)
*G06F 18/40* (2023.01)
*G06N 20/00* (2019.01)
*G06V 10/22* (2022.01)
*G06V 10/25* (2022.01)

(52) U.S. Cl.
CPC ............ *G06V 20/41* (2022.01); *G06F 18/214* (2023.01); *G06F 18/40* (2023.01); *G06N 20/00* (2019.01); *G06V 10/235* (2022.01); *G06V 10/25* (2022.01)

(58) Field of Classification Search
CPC ...... G06V 20/41; G06V 10/235; G06V 10/25; G06K 9/6253; G06K 9/6256; G06N 20/00
See application file for complete search history.

(56) References Cited

U.S. PATENT DOCUMENTS

| | | | | |
|---|---|---|---|---|
| 10,853,943 | B2* | 12/2020 | Laradji | G06F 18/2148 |
| 11,082,731 | B1* | 8/2021 | Cox | H04N 21/2393 |
| 11,100,373 | B1* | 8/2021 | Crosby | G16H 30/40 |
| 11,106,944 | B2* | 8/2021 | Swaminathan | G06V 10/764 |
| 11,138,380 | B2* | 10/2021 | Mwarabu | G06N 3/08 |
| 11,138,469 | B2* | 10/2021 | Almazan | G06V 40/173 |
| 11,176,443 | B1* | 11/2021 | Selva | G06F 18/25 |
| 11,205,082 | B2* | 12/2021 | Adeli-Mosabbeb | G06V 10/82 |

(Continued)

OTHER PUBLICATIONS

Ren et al., "Faster R-CNN: Towards Real-Time Object Detection with Region Proposal Networks", arXiv:1506.01497, Jan. 6, 2016, 14 pages.

(Continued)

*Primary Examiner* — Lewis G West
(74) *Attorney, Agent, or Firm* — Squire Patton Boggs LLP; Sarah Mirza

(57) ABSTRACT

One embodiment of the present invention sets forth a technique for performing a labeling task. The technique includes determining one or more region proposals, wherein each region proposal included in the one or more region proposals includes estimates of one or more bounding boxes surrounding one or more objects in a plurality of video frames. The technique also includes performing one or more operations that execute a refinement stage of a machine learning model to produce one or more refined estimates of the one or more bounding boxes included in the one or more region proposals. The technique further includes outputting the one or more refined estimates as initial representations of the one more bounding boxes for subsequent annotation of the one or more bounding boxes by one or more users.

20 Claims, 8 Drawing Sheets

(56) References Cited

U.S. PATENT DOCUMENTS

| | | | |
|---|---|---|---|
| 11,256,960 B2* | 2/2022 | Lee | G06N 3/08 |
| 11,282,208 B2* | 3/2022 | Cohen | G06T 7/12 |
| 11,302,012 B2* | 4/2022 | Kalra | G06V 10/454 |
| 11,335,004 B2* | 5/2022 | Liu | G06T 7/11 |
| 11,370,423 B2* | 6/2022 | Casas | G06V 10/82 |
| 11,379,683 B2* | 7/2022 | Sha | G06N 3/045 |
| 11,468,538 B2* | 10/2022 | Whiting | G06T 7/0004 |
| 2018/0137642 A1* | 5/2018 | Malisiewicz | G06N 3/044 |
| 2018/0260415 A1* | 9/2018 | Gordo Soldevila | G06F 16/5838 |
| 2020/0167586 A1* | 5/2020 | Gao | G06V 10/82 |
| 2020/0193628 A1* | 6/2020 | Chakraborty | G06F 18/211 |
| 2020/0337776 A1* | 10/2020 | Saun | F16M 13/04 |
| 2021/0312232 A1* | 10/2021 | Tensmeyer | G06N 3/084 |
| 2021/0319242 A1* | 10/2021 | Cholakkal | G06V 10/454 |
| 2021/0326638 A1* | 10/2021 | Lee | G06V 20/46 |
| 2021/0383533 A1* | 12/2021 | Zhao | G06V 20/64 |
| 2022/0026917 A1* | 1/2022 | Beijbom | G05D 1/0251 |
| 2022/0067408 A1* | 3/2022 | Sheu | G06T 11/20 |
| 2022/0067547 A1* | 3/2022 | Kwatra | G06N 5/04 |

OTHER PUBLICATIONS

He et al., "Mask R-CNN", arXiv:1703.06870, Jan. 24, 2018, 12 pages.

* cited by examiner

PRELABELING OF BOUNDING BOXES IN VIDEO FRAMES

CROSS-REFERENCE TO RELATED APPLICATIONS

This application is a divisional of the co-pending U.S. patent application titled, "PRELABELING OF BOUNDING BOXES IN VIDEO FRAMES," filed on Sep. 4, 2020, and having Ser. No. 17/013,448. The subject matter of this related application is hereby incorporated herein by reference.

BACKGROUND

Field of the Various Embodiments

Embodiments of the present disclosure relate generally to labeling of data for machine learning, and more particularly, to prelabeling of bounding boxes in video frames.

Description of the Related Art

Advances in the field of machine learning and increases in available computing power have led to a proliferation in the applications of machine learning. Many machine learning models, including deep neural networks, require large amounts of labeled data to train and verify. Such labeled data typically includes samples that have been tagged with labels. For example, labeled images in which the classifications and locations of objects (e.g., people, cars, etc.) have been tagged may be used to train a machine learning model to perform object classification and localization.

Labeled data can be obtained by relying on human judgment to tag data with appropriate labels. However, such manual labeling of data is time consuming and labor intensive, and few traditional tools exist to facilitate the process of labeling data.

In addition, manually generated labels vary in accuracy and quality, which in turn affects the performance of machine learning models trained and/or validated using the labels. For example, images, text, and/or other data may be provided to a large number of people, along with instructions for generating specific types of labels from the data. As a result, labels produced by multiple people for the same task can differ, depending on the complexity of the instructions, how each person interprets the instructions, the amount of labeling experience the person has, and/or other factors.

As the foregoing illustrates, what is needed in the art are techniques for evaluating and improving labeling quality.

SUMMARY

One embodiment of the present invention sets forth a technique for performing a labeling task. The technique includes determining one or more region proposals, wherein each region proposal included in the one or more region proposals includes estimates of one or more bounding boxes surrounding one or more objects in a plurality of video frames. The technique also includes performing one or more operations that execute a refinement stage of a machine learning model to produce one or more refined estimates of the one or more bounding boxes included in the one or more region proposals. The technique further includes outputting the one or more refined estimates as initial representations of the one more bounding boxes for subsequent annotation of the one or more bounding boxes by one or more users.

One technological advantage of the disclosed techniques is that users are able to label bounding boxes and/or object classes in the images more quickly than conventional techniques that require users to manually specify bounding boxes and/or class labels for all objects in an image. Because the amount of user input or time required to label the bounding boxes and/or object classes is reduced, processing time and/or resource consumption by servers, client devices, and/or applications that provide user interfaces or tools for performing user labeling of the images are also reduced. In turn, machine learning models that are trained or validated using the labels have better performance and/or faster convergence than machine learning models that are trained or validated using noisy and/or inaccurate labels. Consequently, the disclosed techniques provide technological improvements in generating labeled data for machine learning; determining bounding boxes and/or object classes for objects in images; and/or training, validating, and executing machine learning models.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

System Overview

Figure 1:
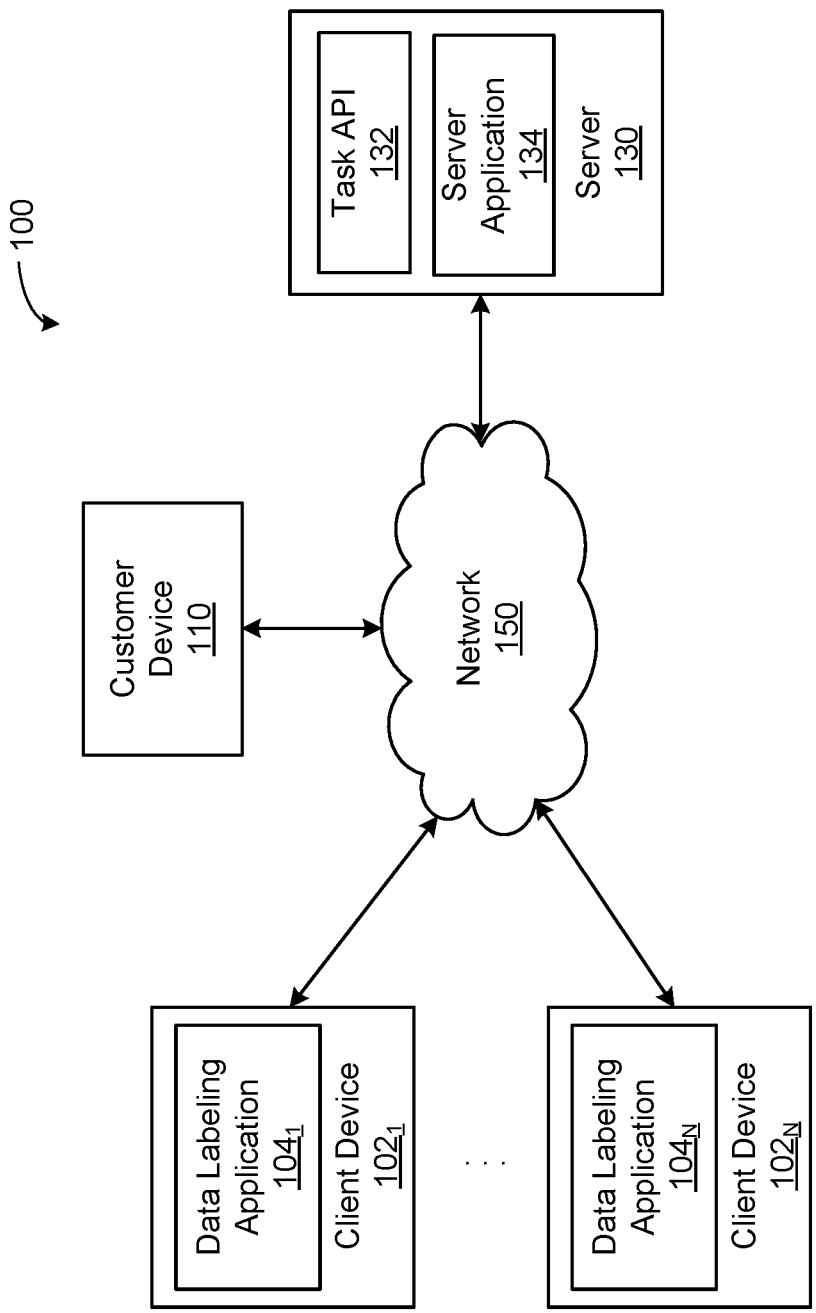
FIG. 1 is a conceptual illustration of a system configured to implement one or more embodiments.

FIG. 1 illustrates a system 100 configured to implement one or more aspects of the present disclosure. As shown, system 100 includes, without limitation, a server computing device 130 (also referred to herein as "server 130") and a number of client devices $102_{1-N}$, each of which is referred to individually herein as a client device 102. Server 130 and client devices $102_{1-N}$ interoperate to facilitate data labeling by users of client devices $102_{1-N}$ in response to a customer request. Server 130, client devices 102$_{1-N}$, and a customer device 110 communicate via a network 150, which may be a wide area network (WAN) such as the Internet, a local area network (LAN), or any other suitable network. Although a single server 130 and customer device 110 are shown for illustrative purposes, system 100 may generally include any number of servers, customer devices, and client devices, each of which may be a physical computing system or a virtual computing system running in, e.g., a data center or cloud.

Illustratively, server 130 exposes a task application programming interface (API) 132 that allows customers to send data and data labeling requests, via API calls. Any suitable data and labeling requests may be transmitted via such API calls to server 130. For example, in the context of autonomous vehicles, photographic, LIDAR (light detection and ranging), and/or radar (radio detection and ranging) data captured by vehicle-mounted sensors may be uploaded from customer device 110 to the server 130, along with a request that particular types of objects (e.g., vehicles, bicycles, pedestrians, etc.) be tagged in such data. GPS (global positioning system) data may also be uploaded and may be included in LIDAR data.

In some embodiments, a server application 134 executing on server 130 requires the data and data labeling requests submitted via API calls to satisfy predefined restrictions. For example, restrictions may exist on which classes (e.g., vehicles, pedestrians, buildings, etc.) of objects can be labeled, the format and size of the data, etc.

Server application 134 processes data received via task API 132 and sends the processed data to data labeling applications 104$_{1-N}$ running in client devices 102$_{1-N}$, along with indications of data labeling tasks to be performed by users of client devices 102$_{1-N}$, based on the customer's request. Any suitable processing of received data may be performed by server application 134. For example, in some embodiments, server application 134 could convert photographic, LIDAR, or radar data received in different formats to a single format that data labeling applications 104$_{1-N}$ can read and process. In another example, server application 134 could compress the received data to a smaller size. Although server application 134 is shown as a single application for illustrative purposes, it should be understood that the functionality of server application 134 may be performed by multiple applications or other types of software in alternative embodiments.

Each of data labeling applications 104$_{1-N}$, referred to individually herein as a data labeling application 104, digests and renders data received from server application 134 for display via a user interface (UI). In some embodiments, data labeling application 104 may render one or more colored point clouds for visualizing three-dimensional (3D) data (e.g., LIDAR and/or radar data), while permitting users to navigate and view the point clouds from different perspectives. For example, in some embodiments, data labeling application 104 may use down sampling to obtain an aggregated point cloud that includes only points conveying the most information. In another example, data labeling application 104 could, based on a user specification, blend point cloud colorings derived from different data sources (e.g., photographic, label, and/or LIDAR intensity data). In addition to displaying rendered point clouds via a UI, data labeling application 104 may also display photographs associated with those point clouds at the same time.

In some embodiments, data labeling application 104 provides tools to facilitate data labeling tasks. For example, the tools could allow a user to draw annotations in the form of cuboids or bounding boxes, label points as belonging to particular objects, etc. using a mouse and/or keyboard. As additional examples, tools could be provided that automatically adjust the position and/or orientation of a user-designated cuboid, propagate a user-designated cuboid from a key frame to other frames, etc., thereby aiding the user in performing data labeling tasks.

Figure 2:
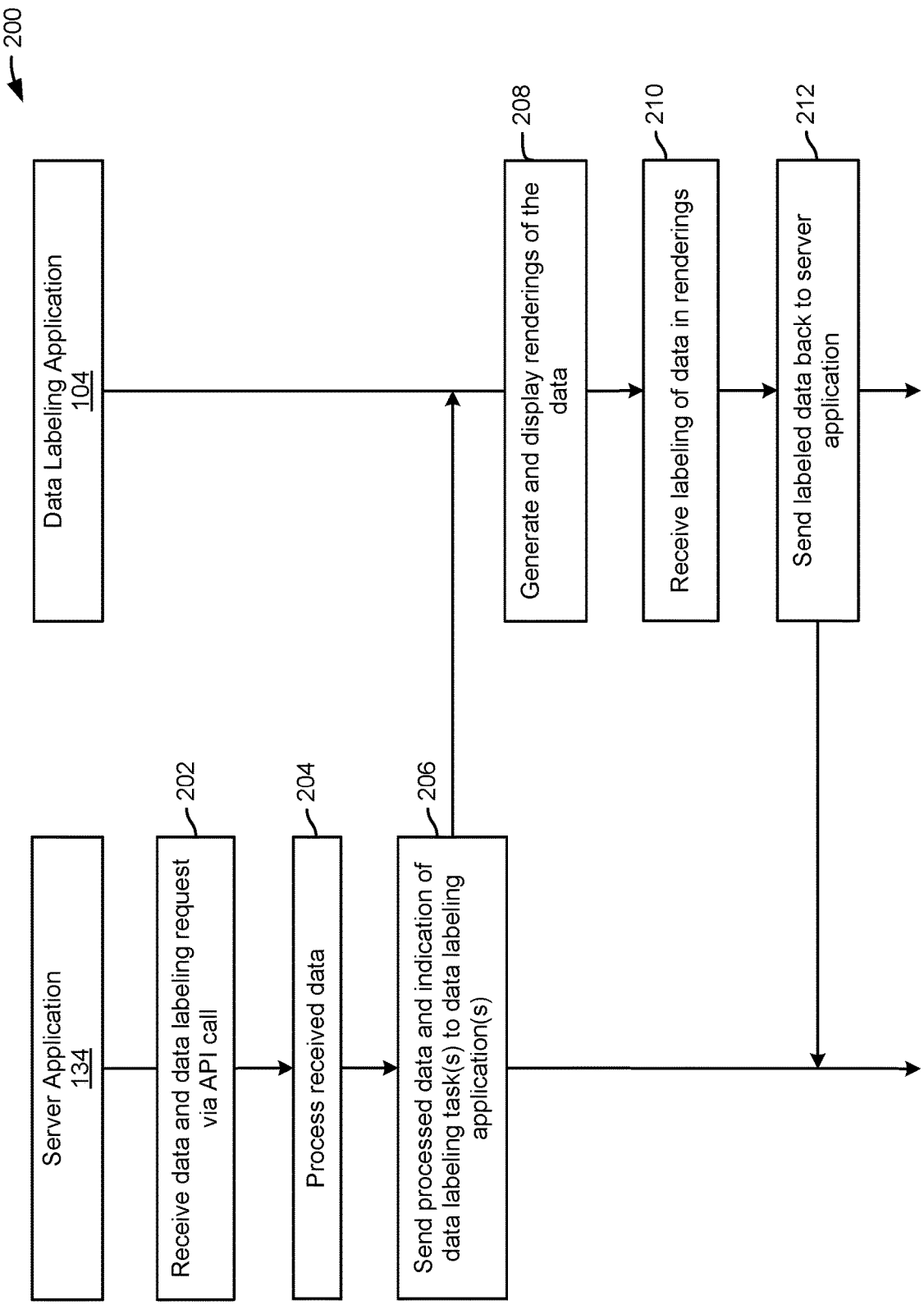
FIG. 2 is a flow diagram of method steps for processing data labeling requests, according to various embodiments.

FIG. 2 is a flow diagram of method steps for processing data labeling requests, according to various embodiments. Although the method steps are described with reference to the system of FIG. 1, persons skilled in the art will understand that any system may be configured to implement the method steps, in any order, in other embodiments.

As shown, a method 200 begins at step 202, where server application 134 receives data and a corresponding data labeling request via an API call. The data may be in any suitable format acceptable to server application 134. For example, server application 134 may need data to be sent in one or more JavaScript Object Notation (JSON) files. Similarly, the data labeling request may need to satisfy certain restrictions, such as which classes (e.g., vehicles, pedestrians, buildings, etc.) of objects can be labeled.

At step 204, server application 134 processes the received data. Any suitable processing may be performed by server application 134. In some embodiments, the processing may include compressing the received data and/or converting the received data into a format that can be read by data labeling application(s). For example, the received data could be converted to a data format in which points of a 3D point cloud are represented in a list as (x, y, z) coordinates with associated time stamps.

At step 206, server application 134 sends the processed data and an indication of data labeling task(s), based on the received request, to one or more data labeling applications. Although one data labeling application 104 is shown for illustrative purposes, it should be understood that server application 134 may send the processed data and indication of data labeling task(s), via a network, to any number of data labeling applications running on different client devices.

At step 208, a data labeling application 104 generates and displays renderings of the received data. For example, data labeling application 104 may display rendered point cloud(s) via a UI that permits a user to navigate and view the point cloud(s) from different perspectives. The UI may also, or instead, display text and/or images, and data labeling application 104 may provide tools to facilitate labeling of the rendered point cloud(s), text, images, and/or other data via the UI.

At step 210, data labeling application 104 receives labeling of data in the renderings. For example, the user could look around a two-dimensional (2D) or 3D scene, identify objects of interest, use a mouse to indicate where those objects are located, use the mouse and a keyboard to precisely size cuboids or bounding boxes around the objects, etc. In such a case, the user may further navigate forward and/or backwards in time to see where the objects move over time, and label the objects in every frame that is associated with a distinct point in time. As described, data labeling application 104 may provide tools that enable such labeling, as well as tools that facilitate user labeling by, e.g., automatically adjusting the position and/or orientation of a user-designated cuboid, propagating a cuboid from one frame designated as a key frame to other frames, etc.

At step 212, data labeling application 104 sends the labeled data back to server application 134. The labeled data may be sent to server application 134 via a network, such as the Internet, and server application 134 may then return the labeled data to the customer. In some embodiments, optional verification and/or other processing may be performed prior to returning labeled data to the customer.

Figure 3:
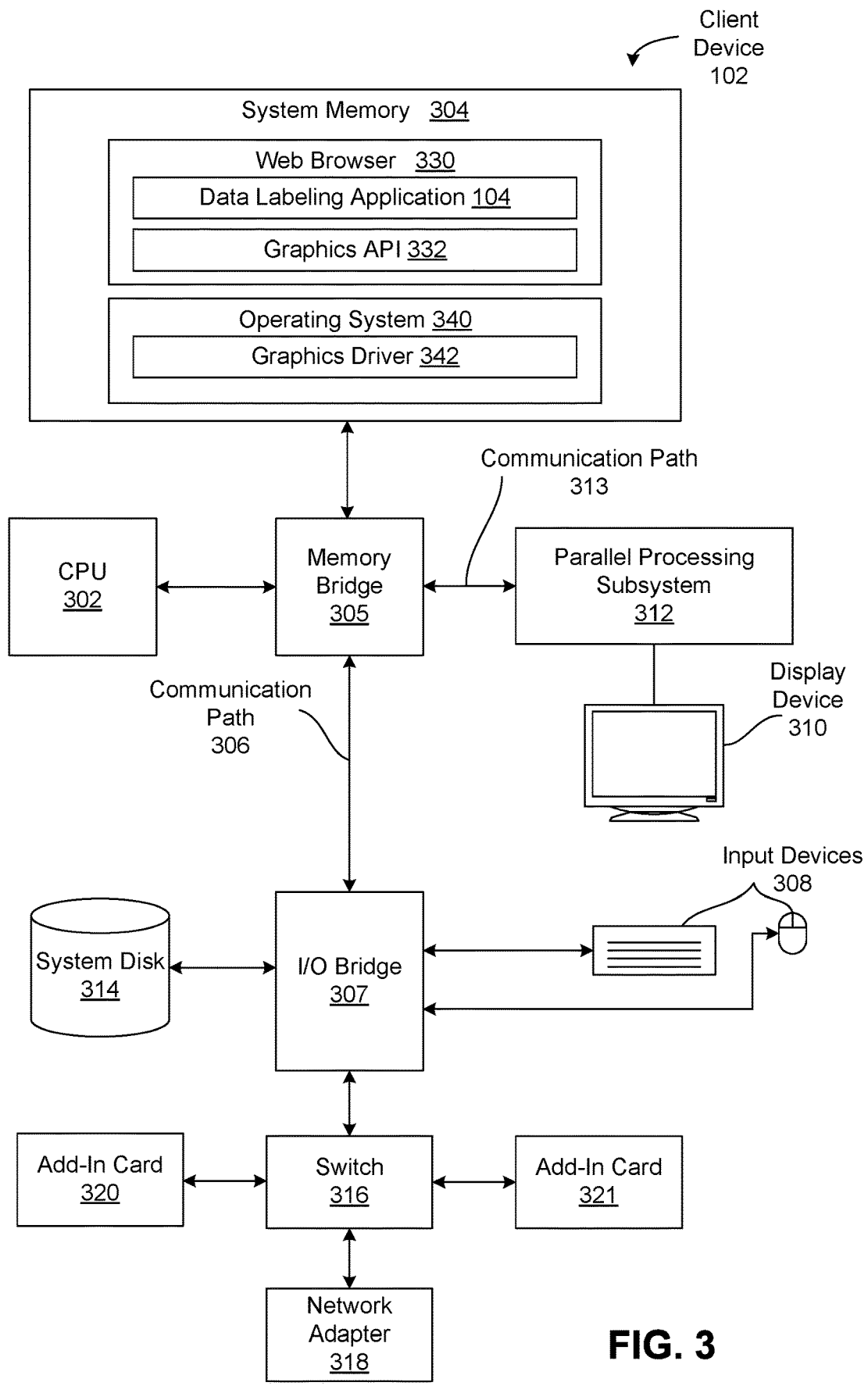
FIG. 3 is a more detailed illustration of the client device of FIG. 1, according to various embodiments.

FIG. 3 is a more detailed illustration of the client device of FIG. 1, according to various embodiments. Although client device 102 is shown for illustrative purposes, it should be understood that server 130 and customer device 110 may include similar physical components as client device 102, but run different software such as server application 134.

As shown, client device 102 includes, without limitation, a central processing unit (CPU) 302 and a system memory 304 coupled to a parallel processing subsystem 312 via a memory bridge 305 and a communication path 313. Memory bridge 304 is further coupled to an I/O (input/output) bridge 307 via a communication path 306, and I/O bridge 307 is, in turn, coupled to a switch 316.

In operation, I/O bridge 307 is configured to receive user input information from input devices 308, such as a keyboard or a mouse, and forward the input information to CPU 302 for processing via communication path 306 and memory bridge 305. Switch 316 is configured to provide connections between I/O bridge 307 and other components of computer system 300, such as a network adapter 318 and various add-in cards 320 and 321.

I/O bridge 307 is coupled to a system disk 314 that may be configured to store content, applications, and data for use by CPU 302 and parallel processing subsystem 312. As a general matter, system disk 314 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to the I/O bridge 307 as well.

In various embodiments, memory bridge 305 may be a Northbridge chip, and I/O bridge 307 may be a Southbridge chip. In addition, communication paths 306 and 313, as well as other communication paths within client device 102, may be implemented using any technically suitable protocols, including, without limitation, AGP (Accelerated Graphics Port), HyperTransport, or any other bus or point-to-point communication protocol known in the art.

In some embodiments, parallel processing subsystem 312 includes a graphics subsystem that delivers pixels to a display device 310 that may be any conventional cathode ray tube, liquid crystal display, light-emitting diode display, or the like. In such embodiments, parallel processing subsystem 312 incorporates circuitry optimized for graphics and video processing, including, for example, video output circuitry. Such circuitry may be incorporated across one or more parallel processing units (PPUs) included within parallel processing subsystem 312. In other embodiments, parallel processing subsystem 312 incorporates circuitry optimized for general purpose and/or compute processing. Again, such circuitry may be incorporated across one or more PPUs included within parallel processing subsystem 312 that are configured to perform such general purpose and/or compute operations. In yet other embodiments, the one or more PPUs included within parallel processing subsystem 312 may be configured to perform graphics processing, general purpose processing, and compute processing operations. System memory 304 includes at least one device driver configured to manage the processing operations of the one or more PPUs within parallel processing subsystem 312.

In various embodiments, parallel processing subsystem 312 may be integrated with one or more of the other elements of FIG. 3 to form a single system. For example, parallel processing subsystem 312 may be integrated with the CPU 302 and other connection circuitry on a single chip to form a system on chip (SoC).

It will be appreciated that the system shown herein is illustrative and that variations and modifications are possible. The connection topology, including the number and arrangement of bridges, the number of CPUs, and the number of parallel processing subsystems, may be modified as desired. For example, in some embodiments, system memory 304 could be connected to CPU 302 directly rather than through memory bridge 305, and other devices would communicate with system memory 304 via memory bridge 305 and CPU 302. In other alternative topologies, parallel processing subsystem 312 may be connected to I/O bridge 307 or directly to CPU 302, rather than to memory bridge 305. In still other embodiments, I/O bridge 307 and memory bridge 305 may be integrated into a single chip instead of existing as one or more discrete devices. Lastly, in certain embodiments, one or more components shown in FIG. 3 may not be present. For example, switch 316 could be eliminated, and network adapter 318 and add-in cards 320, 321 would connect directly to I/O bridge 307.

Illustratively, data labeling application 104 that runs in client device 102 is a web application running in a web browser 330. Although shown as a web application for illustrative purposes, data labeling application 104 may be implemented as a native application, mobile application, or other type of software in alternative embodiments. Further, functionality of data labeling application 104 may be distributed across multiple pieces of software in some embodiments. As shown, system memory 316 stores web browser 330 and an operating system 340 on which web browser 330 runs. Operating system 340 may be, e.g., Linux® or Microsoft Windows® and includes a graphics driver 342 that implements a graphics API 332 exposed by the web browser 330 for rendering content, via parallel processing subsystem 312 (and/or CPU 302). For example, graphics API 332 could be WebGL (Web Graphics Library), which is a JavaScript API for rendering interactive 3D and 2D graphics within a compatible web browser. In some embodiments, data labeling application 104 invokes graphics API 332 to render 3D point clouds, 2D images, and/or other types of data, and data labeling application 104 provides tools that facilitate the labeling of data, according to techniques disclosed herein.

In alternate embodiments, system 100 may include any number of client devices 102, any number of servers 130, any number of customer devices 110, any number of memories 304, and any number of processors 302 that are implemented in any technically feasible fashion. Further, client devices 102, servers 130, memory 304, and processor 302 may be implemented via any number of physical resources located in any number of physical locations. For example, memory 304 and processor 302 could be implemented in a cloud computing environment or a distributed computing environment that is accessible to client device 102. The connection topology between the various units in FIGS. 1 and 2 may be modified as desired.

Prelabeling of Bounding Boxes in Video Frames

Figure 4A:
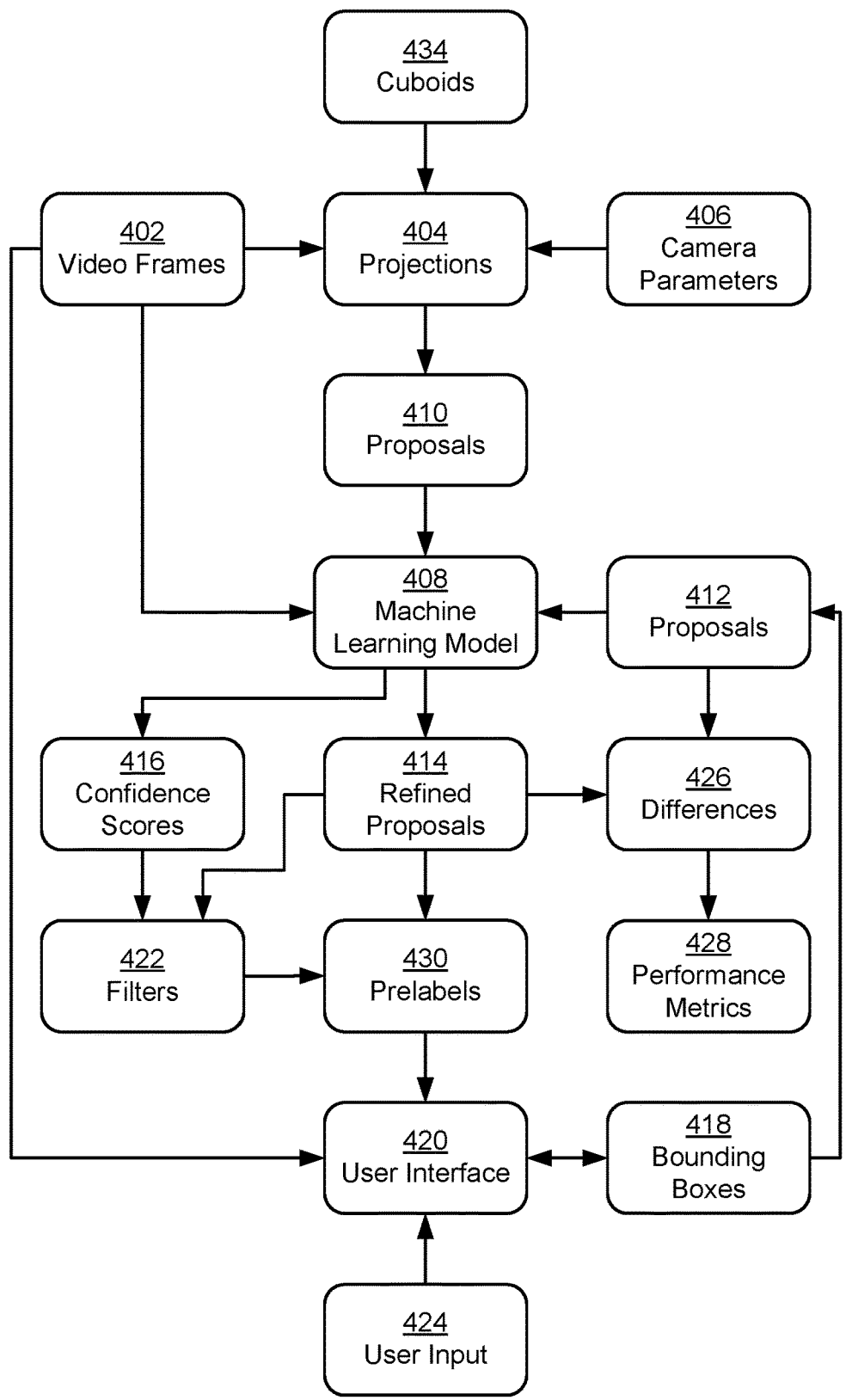
FIG. 4A illustrates the prelabeling of bounding boxes in video frames, according to various embodiments.

FIG. 4A illustrates the prelabeling of bounding boxes 418 in video frames 402, according to various embodiments.

Steps carried out to generate prelabels 430 of bounding boxes 418 may be performed by server application 134 and/or other components of server 130. These steps may also, or instead, be performed by customer device 110, one or more client devices $102_{1-N}$, and/or other components of system 100.

Video frames 402 include a series of two-dimensional (2D) images captured by a camera. For example, video frames 204 may include images captured by a camera mounted on an autonomous vehicle. As a result, the images may include visual representations of pedestrians, roads, skies, buildings, trees, cars, trucks, and/or other objects in the vicinity of the autonomous vehicle.

In one or more embodiments, prelabels 430 include estimates of bounding boxes 418 for certain types of objects in video frames 402. These prelabels 430 can be used to assist or expedite the generation of more accurate bounding boxes 418 by one or more users via a user interface 420. For example, a machine learning model 408 produces prelabels 430 as estimates of bounding boxes 418 for certain classes of objects (e.g., cars, trucks, motorcycles, bicycles, pedestrians, etc.) in each video frame. Prelabels 430 are then used as an initial representation of bounding boxes 418, which are outputted as overlays, highlighting, shading, rectangular regions, outlines, and/or other visual representations in individual video frames 402 within a graphical user interface 420 provided by data labeling application 104. A user can then provide user input 424 for adjusting the outputted bounding boxes 418 and/or otherwise specifying bounding boxes 418 via user interface 420. In other words, prelabels 430 represent initial estimates of bounding boxes 418, which are outputted with video frames 402 in user interface 420 to reduce the amount of user input 424 required to specify labels for bounding boxes 418 and/or improve the accuracy of the labels.

As shown, input to machine learning model 408 includes video frames 402, as well as proposals 410 of bounding boxes 418 that are generated as projections 404 of 3D cuboids 434 onto 2D video frames 402. In some embodiments, cuboids 434 include user-generated and/or machine learning annotations of 3D bounding volumes for 3D point clouds of the objects. For example, a number of users may interact with tools provided by data labeling application 104 to specify cuboids 434. The tools allow the users to rotate, scale, and/or otherwise view a 3D scene produced by a light detection and ranging (LIDAR) system (e.g., on an autonomous vehicle); specify or adjust corners or dimensions of cuboids 434 that bound point clouds representing objects in the scene; assign labels to objects bounded by cuboids 434; and/or propagate a cuboid of an object across video frames 402 containing the object. In another example, a machine learning model (not shown) outputs cuboids 434 as predictions of bounding volumes for certain types of objects in a 3D scene. The machine learning model optionally outputs classes of objects bounded by cuboids 434.

As a result, projections 404 are generated by mapping 3D points in cuboids 434 onto 2D coordinates or pixel locations in video frames 402. For example, eight 3D points denoting the corners of each cuboid are transformed into up to eight 2D pixel coordinates in video frames 402 in which the corresponding object appears.

In one or more embodiments, projections 404 are generated using cuboids 434 and camera parameters 406 related to the capture of each set of video frames 402 by a camera. For example, camera parameters 406 include a 3D position and orientation of the camera, a camera model (e.g., pinhole, fisheye, omnidirectional, proprietary, etc.) used to convert 3D cuboids 434 into 2D projections 404 in video frames 402, a focal length of the camera in one or more directions, and/or the principal point of the camera. Camera parameters 406 also include an optional skew coefficient, one or more radial distortion coefficients, one or more tangential distortion coefficients, and/or a reference frame offset used by the camera model. In turn, a perspective transformation is used with camera parameters 406 to convert 3D points in cuboids 434 into 2D projections 404 onto the image plane of the camera.

Proposals 410 are then created from projections 404 of each cuboid into a set of 2D points in video frames 402. For example, each proposal is produced as the minimum bounding box for up to eight 2D pixel locations that represent projections 404 of 3D points in a cuboid onto a video frame.

After video frames 402 and proposals 410 are inputted into machine learning model 408, machine learning model 408 outputs refined proposals 414 representing more accurate bounding boxes 418 for objects in video frames 402. These refined proposals 414 may be produced by convolutional and/or other neural network layers in one or more stages of machine learning model 408.

In some embodiments, machine learning model 408 includes one or more portions of a Faster Regions with CNN (R-CNN) object detection architecture. The Faster R-CNN architecture includes a number of convolutional layers, a region proposal stage, and a refinement stage that includes a Fast R-CNN object detection network. The convolutional layers extract feature maps from an input image (e.g., each of video frames 402). Feature maps extracted by the convolutional layers are fed into the region proposal stage, which outputs region proposals (e.g., proposals 410) representing regions of interest in the image that are parameterized with respect to "anchor" reference boxes. The region proposal stage additionally outputs "objectness scores" representing the likelihoods that the regions of interest contain objects.

The feature maps and region proposals are then fed into the refinement stage, which performs bounding box regression to produce refined proposals 414 that more accurately represent the boundaries of the objects in the image. In particular, the refinement stage includes a Region of Interest (RoI) pooling layer that crops and resizes the feature maps according to the region proposals. The refinement stage additionally includes a number of fully connected layers, a classification branch, and a regression branch. The resized feature maps are fed into the fully connected layers, and output of the fully connected layers is processed by the classification and regression branches. The classification branch outputs confidence scores 416 representing probabilities that each refined proposal belongs (or does not belong) to a set of object classes, including a miscellaneous "background" class. The regression branch performs bounding box regression on features outputted by the fully connected layers to produce refined proposals 414 that are improved bounding boxes for objects in the image. The regression branch includes a separate regressor for each class (excluding the background class), so that each proposal inputted into the refinement stage results in c refined proposals 414 for c classes.

In one or more embodiments, the Faster R-CNN architecture is trained using a set of images and a set of ground truth bounding boxes and labels for objects in the images. For example, images in the training data include video frames captured by cameras of environments or scenes that are similar to those in video frames 402. Similarly, ground truth bounding boxes and labels in the training data include user-generated annotations of objects in the images. Classes related to the labels are selected to allow for subsequent detection of the classes in video frames 402. The training data is optionally filtered to remove ground truth bounding boxes and corresponding labels for objects that are occluded beyond a threshold amount (e.g., beyond a certain proportion of an object's size) and/or that are smaller than a threshold size (e.g., less than a certain number of pixels) in the images.

More specifically, training of the Faster R-CNN architecture involves training both the region proposal and refinement stages. During training of the region proposal stage, a proposal is assigned a positive label of containing an object when the proposal has the highest Intersection-over-Union (IoU) with a ground truth bounding box or has an IoU of greater than 0.7 with any ground truth bounding box. Conversely, a proposal is assigned a negative label of not containing an object when its IoU with all ground truth bounding boxes is less than 0.3. Remaining region proposals that lack positive or negative labels are omitted from training of the region proposal stage. The region proposal stage can then be trained end-to-end via backpropagation and stochastic gradient descent using the following multi-task loss function:

$$L(\{p_i\}, \{t_i\}) = \frac{1}{N_{cls}} \sum_i L_{cls}(p_i, p_i^*) + \lambda \frac{1}{N_{reg}} \sum_i p_i^* L_{reg}(t_i, t_i^*).$$

In the above loss function, i is the index of a proposal, $p_i$ is the predicted probability of the proposal being an object, and $p_i^*$ is the ground truth label for the proposal (i.e. 1 for a positive label and 0 for a negative label). Similarly, $t_i$ is a vector representing four parameterized coordinates of the predicted bounding box, and $t_i^*$ is the ground truth bounding box for an object associated with a positive label. The parameterized coordinates for the predicted and ground truth bounding boxes are calculated using the following:

$$t_x = (x - x_a)/w_a, \quad t_y = (y - y_a)/h_a,$$
$$t_w = \log(w/w_a), \quad t_h = \log(h/h_a),$$
$$t_x^* = (x^* - x_a)/w_a, \quad t_y^* = (y^* - y_a)/h_a,$$
$$t_w^* = \log(w^*/w_a), \quad t_h^* = \log(h^*/h_a),$$

where x, y, w, and h represent a predicted bounding box's center coordinates, width, and height; $x_a$, $y_a$, $w_a$, and $h_a$ represent a corresponding anchor's center coordinates, width, and height; and $x^*$, $y^*$, $w^*$, and $h^*$ represent a corresponding ground truth bounding box's center coordinates, width, and height.

Continuing with the above loss function, the classification loss $L_{cls}$ is a log loss over two classes of object and non-object, and the regression loss includes the form $L_{reg}=R(t_i-t_i^*)$, where R is a smooth $L_1$ loss function. The regression loss is activated only for positively labeled proposals and disabled otherwise. The loss terms are optionally normalized by $N_{cls}$ and $N_{reg}$ and weighted by a balancing parameter k.

During training of the refinement stage (i.e., the Fast R-CNN object detection network in the Faster R-CNN architecture), proposals outputted by the region proposal stage are labeled with a ground truth class u and a ground truth bounding box regression target v. The refinement stage is then trained via backpropagation and stochastic gradient descent using the following multi-task loss function:

$$L(p, u, t^u, v) = L_{cls}(p, u) + \lambda_r[u \geq 1]L_{loc}(t^u, v)$$

In the above loss function, $p = (p_0, \ldots, p_K)$ is a discrete probability distribution of a given proposal over K+1 object categories, with probabilities in the distribution representing confidence scores 416 in the corresponding categories. The classification loss $L_{cls}(p, u) = -\log p_u$ is the log loss for the true class u. The regression loss $L_{loc}$ is defined, for a given class u, over a tuple of ground truth bounding box regression targets $v = (v_x, v_y, v_w, v_h)$ and a corresponding predicted tuple $$t^u = (t_x^u, t_y^u, t_w^u, t_h^u)$$

representing a refined proposal outputted by the refinement stage. The term [u≥1] evaluates to 1 when u≥1 and 0 when u=0 (i.e., when u is the background class). The hyperparameter $\lambda_r$ controls the balance between the two task losses. The regression loss additionally includes the following representation:

$$L_{loc}(t^*, v) = \sum_{i \in (x,y,w,h)} \text{smooth}_{L_1}(t_i^* - v_2),$$

where $$\text{smooth}_{L_1}(x) = \begin{cases} 0.5x^2 & \text{if } |x| < 1 \\ |x| - 0.5 & \text{otherwise} \end{cases}$$

In some embodiments, the Faster R-CNN architecture is trained using a four-step alternating training technique. In the first step, the region proposal stage is trained using the training data described above and the corresponding loss function. In the second step, the refinement stage is trained using the proposals generated by the trained region proposal stage and the corresponding loss function. Because the region proposal and refinement stages are trained separately in the first two steps, the stages do not share convolutional layers. In the third step, the convolutional layers from the refinement stage are fixed, and the region proposal stage is fine-tuned with respect to the fixed convolutional layers. In the fourth step, the refinement stage is fine-tuned with respect to the fixed convolutional layers and proposals outputted by the fine-tuned region proposal stage. After all four steps are complete, both stages share the same convolutional layers and form a unified network.

After the Faster R-CNN architecture is trained, the refinement stage of the Faster R-CNN architecture is used as machine learning model 408 to produce refined proposals 414 from initial proposals 410 and video frames 402. For example, video frames 402 are inputted into the convolutional layers to produce feature maps, and the feature maps and proposals 410 generated from projections 404 of cuboids 434 onto video frames 402 are inputted into the refinement stage to produce refined proposals 414 and confidence scores 416.

Refined proposals 414 and confidence scores 416 outputted by machine learning model 408 are then used to generate prelabels 430 of bounding boxes 418 for objects in video frames 402. As shown, one or more filters 422 are applied to refined proposals 414 and the corresponding confidence scores 416, so that prelabels 430 contain a subset of refined proposals 414 that meet criteria represented by filters 422. For example, filters 422 may include a limit to the number of prelabels 430 for a given class and/or all classes. As a result, refined proposals 414 may be ordered by descending confidence scores 416 for the relevant class(es), and individual refined proposals 414 in the ordering may be added to prelabels 430 until the limit is reached. In another example, filters 422 may include a minimum threshold for confidence scores 416 in one or more classes. The minimum threshold may be manually set (e.g., to a value of 0.05 and/or a quantile) and/or tuned (e.g., based on user annotations of bounding boxes 418 related to prelabels 430 and/or requirements related to use of bounding boxes 418). In turn, prelabels 430 include refined proposals 414 with confidence scores 416 that meet the threshold.

Prelabels 430 are then outputted in user interface 420 as initial representations of bounding boxes 418 for objects in video frames 402. In turn, users performing a labeling task related to bounding boxes 418 and video frames 402 provide user input 424 via user interface 420 to interact with bounding boxes 418, update bounding boxes 418, select or confirm object classes associated with bounding boxes 418, and/or otherwise generate user input 424 related to the labeling task.

For example, user interface 420 includes a graphical user interface (GUI), web-based user interface, touch user interface, voice user interface, and/or another type of interface for outputting video frames 402, bounding boxes 418, and/or classes associated with bounding boxes 418. User interface 420 may be provided by client devices $102_{1-N}$ and/or other components of the system of FIG. 1. User interface 420 may display individual video frames 402 and prelabels 430 as initial representations of bounding boxes 418 over video frames 402. User interface 402 may optionally display coloring, highlighting, text, and/or another indication of the class with the highest confidence score for each prelabel. User interface 420 additionally includes components for receiving user input 424 related to bounding boxes 418. These components include tools for zooming in and out of each video frame, navigating between and/or across video frames 402, adding or deleting bounding boxes 418 for objects in video frames 402, adjusting the locations or dimensions of bounding boxes 418 in each video frame, changing classes associated with bounding boxes 418, and/or otherwise specifying user input 424 related to labeling bounding boxes 418. Each user may continue providing user input 424 to user interface 420 until labeling of bounding boxes 418 in video frames 402 is complete.

In some embodiments, machine learning model 408 is additionally used to evaluate the accuracy of bounding boxes 418 submitted by users via user interface 420. More specifically, user annotations (i.e., user-generated labels) of bounding boxes 418 are submitted by multiple users performing labeling tasks related to video frames 402. As a result, bounding boxes 418 may vary in quality and accuracy, which can impact the performance of machine learning models (not shown) trained using bounding boxes 418.

To mitigate the adverse impact of inaccurate and/or inconsistent user-generated bounding boxes 418 on subsequent machine learning training, validation, and inference, bounding boxes 418 are converted into additional sets of proposals 412 that are inputted into machine learning model 408, and differences 426 between the inputted proposals 412 and refined proposals 414 outputted by machine learning model 408 from proposals 412 are determined. Differences 426 are then used to calculate and/or update performance metrics 428 for the corresponding users, which allows the users' labeling performance with various types of labeling tasks to be evaluated and/or tracked over time.

For example, each set of proposals 412 may be obtained as bounding boxes 418 submitted by a user for one or more object classes and/or from one or more video frames 402. The convolutional layers and refinement stage of a Faster R-CNN network are applied to each set of proposals 412 to produce a corresponding set of refined proposals 414 and confidence scores 416. Differences 426 are then calculated as IoUs between proposals 412 and refined proposals 414, and performance metrics 428 are calculated based on comparisons of the IoUs and/or aggregated values of the IoUs (e.g., averages, weighted averages, etc.) with one or more thresholds. These thresholds include an 0.8 threshold for an IoU between a proposal that is a user annotation of a bounding box and a corresponding refined proposal generated by machine learning model 408 from the user annotation. If the IoU falls below the 0.8 threshold, the user annotation may be rejected, and performance metrics 428 for the user that provided the annotation may be updated to reflect the rejection (e.g., by including a "failing" score for the annotation in the user's labeling performance). These thresholds optionally include higher IoU thresholds (e.g., 0.85, 0.9, 0.95, 0.99, etc.), which are used in fine-grained assessment of the user's bounding box labeling performance. In turn, performance metrics 428 for the user include one or more scores or ratings that reflect the highest threshold met by one or more IoUs between the user's bounding box annotations and corresponding refined proposals. A higher score or better rating indicates a higher IoU, and a lower score or worse rating indicates a lower IoU. If the user's scores indicate a low level of performance with respect to the labeling task, training samples and/or educational workflows for the labeling task may be added to the user's list of tasks. As the user interacts with the training samples and/or educational workflows, instructions for generating accurate labels and/or feedback related to the user's labeling mistakes may be provided to allow the user to improve at the labeling task. If the user continues to underperform at the labeling task, the user's task list may be adjusted to reduce assignments of the same type of labeling task to the user and/or increase assignments of other types of labeling tasks at which the user performs well.

Those skilled in the art will appreciate that other machine learning architectures may be used to train and/or execute machine learning model 408, generate refined proposals 414, and/or otherwise select or modify output in user interface 420. For example, an R-CNN, Fast R-CNN, You Only Look Once (YOLO), and/or another type of object detection architecture may be used to train one or more portions of machine learning model 408 and/or generate refined proposals 414 and/or proposals 410.

In another example, proposals 410 may be generated by inputting video frames 402 into the region proposal stage of the Faster R-CNN architecture. Non-maximum suppression (NMS) may be used to filter proposals 410, and the filtered proposals 410 may be inputted into the refinement stage of the Faster R-CNN architecture to produce refined proposals 414 and corresponding confidence scores 416. Filters 422 may then be applied to confidence scores 416 and/or refined proposals 414 to select prelabels 430, and prelabels 430 may be outputted in user interface 420 to assist users in labeling or annotating bounding boxes 418 for objects in video frames 402. In other words, proposals 410 may be produced by the region proposal stage from video frames 402. This type of proposal generation may be performed instead of or in addition to generating proposals 410 from projections 404 of cuboids 434 onto video frames 402.

Figure 4B:
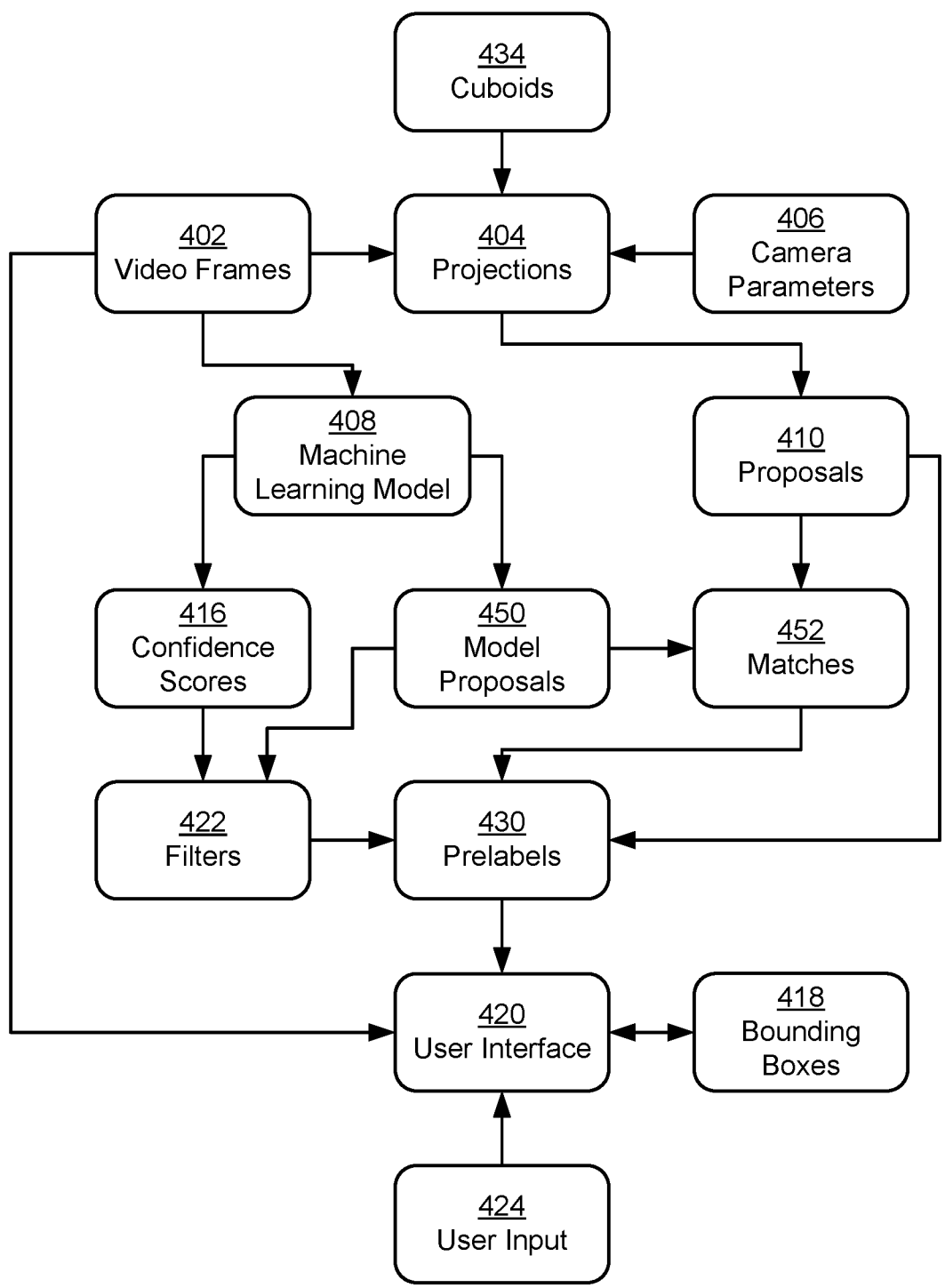
FIG. 4B illustrates the prelabeling of bounding boxes in video frames, according to various embodiments.

FIG. 4B illustrates the prelabeling of bounding boxes in video frames, according to various embodiments. More specifically, FIG. 4B shows a technique for generating prelabels 430 of bounding boxes 418 in video frames 402 that is an alternative to the technique illustrated in FIG. 4A.

As shown in FIG. 4B, input into machine learning model 408 includes video frames 402 and lacks proposals 410 that are generated from projections 404 of cuboids 434 onto video frames 402. In response to the inputted video frames 402, machine learning model 408 generates model proposals 450 representing estimates of bounding boxes 418 for objects in video frames 402. For example, machine learning model 408 may include both the region proposal and refinement stages of a Faster R-CNN architecture, which is trained using the technique described above with respect to FIG. 4A. Video frames 402 may be inputted into the region proposal stage, non-maximum suppression (NMS) may be used to filter proposals outputted by the region proposal stage, and the filtered proposals may be inputted into the refinement stage of the Faster R-CNN architecture to produce model proposals 450 and corresponding confidence scores 416.

Prelabels 430 are then generated based on matches 452 between model proposals 450 and proposals 410 from projections 404 of cuboids 434 onto video frames 402. In some embodiments, matches 452 are calculated based on one or more thresholds for IoUs between at least a portion of model proposals 450 (e.g., model proposals 450 with confidence scores 416 that meet filters 422, all model proposals 450, etc.) and proposals 410. For example, an initial match between a model proposal outputted by machine learning model 408 from a video frame and a proposal generated from a projection of a cuboid onto the same video frame may be identified when the IoU between the model proposal and the projection-based proposal exceeds a threshold of 0.5 (or another numeric value). In addition, matches between model proposals and projection-based proposals may be made in a way that maximizes the overall (e.g., sum, average, etc.) IoU between all model proposals and projection-based proposals. Thus, if two or more projection-based proposals have a greater than 50% IoU with a model proposal, the model proposal is matched to the projection-based proposal with the highest IoU with the model proposal.

Matches 452 are then used to generate at least a portion of prelabels 430 that are outputted in user interface 420. In one or more embodiments, model proposals 450 that are matches 452 with projection-based proposals 410 are used as prelabels 430 for the corresponding objects in lieu of these projection-based proposals 410 (e.g., to correct for projection-based proposals 410 that are larger than the corresponding objects and/or shifted). When a projection-based proposal does not have a match with a model proposal (e.g., when the projection-based proposal has an IoU of less than 50% with all model proposals and/or has a lower IoU with one or more model proposals than other projection-based proposals), the projection-based proposal is included in prelabels 430. This technique of generating prelabels 430 from matches 452 between model proposals 450 and projection-based proposals 410 may be used in lieu of or in addition to the technique of FIG. 4A.

After the technique(s) of FIGS. 4A and/or 4B are used to generate prelabels 430, prelabels 430 are outputted in user interface 420 as initial representations of bounding boxes 418 for objects in video frames 402. Users performing a labeling task related to bounding boxes 418 and video frames 402 may subsequently provide user input 424 via user interface 420 to interact with bounding boxes 418, update bounding boxes 418, select or confirm object classes associated with bounding boxes 418, and/or otherwise generate user input 424 related to the labeling task, as discussed above.

Figure 5:
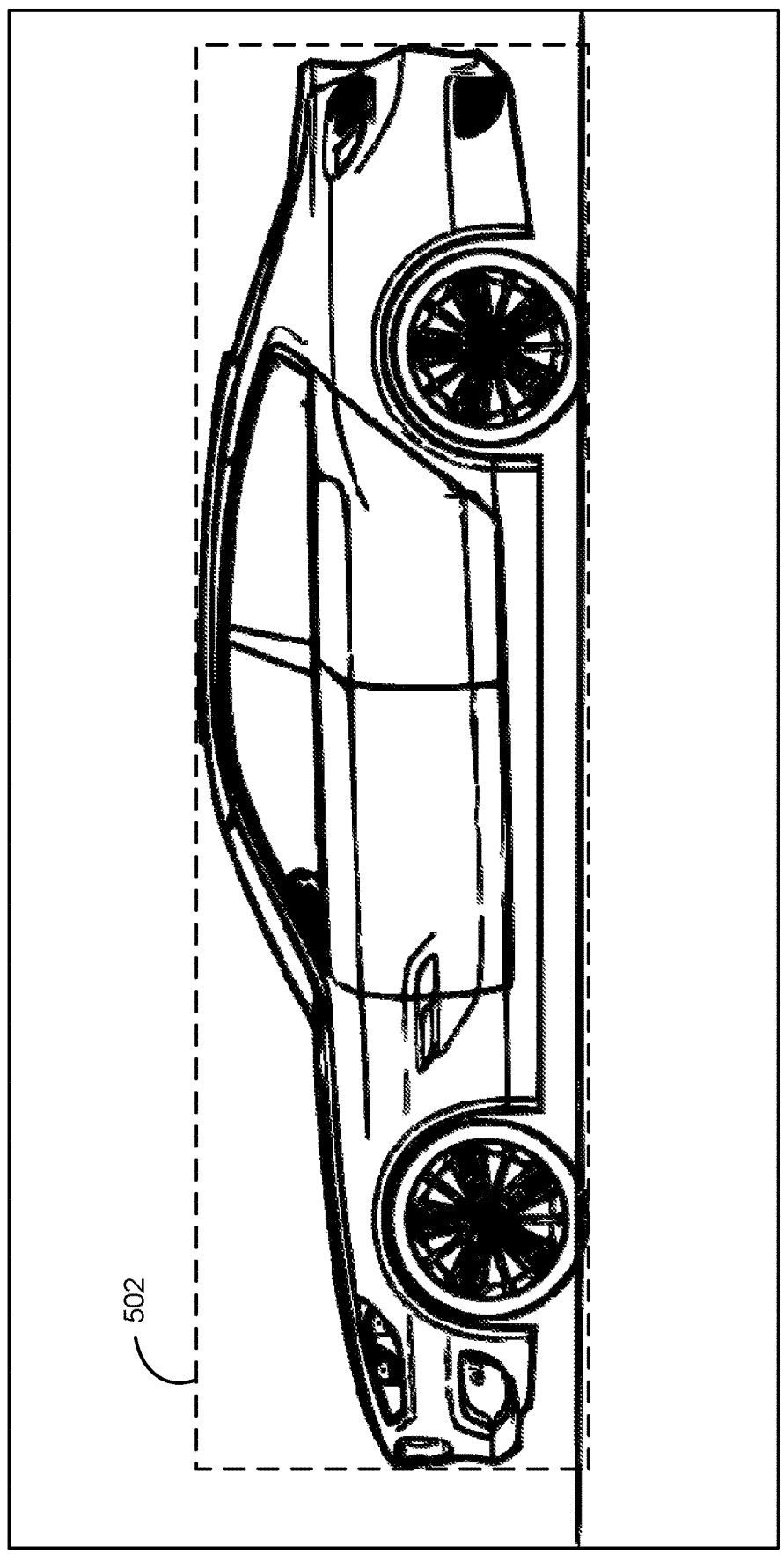
FIG. 5 illustrates an example screenshot of the user interface (UI) of FIG. 4, according to various embodiments.

FIG. 5 illustrates an example screenshot of user interface 420 of FIGS. 4A and 4B, according to various embodiments. As mentioned above, user interface 420 is configured to assist a user with providing an annotation of a bounding box 502 for an object in an image (e.g., one of video frames 402 of FIG. 4). In particular, the example user interface 402 of FIG. 5 allows the user to specify bounding box 502 for a car in the image.

As shown, bounding box 502 is displayed as a rectangular overlay in the image within the example user interface 402. In addition, the size and location of bounding box 502 in user interface 402 is initialized to match a prelabel (e.g., prelabels 430 of FIG. 4) for bounding box 502. This prelabel may be generated by a machine learning model (e.g., machine learning model 408 of FIG. 4) based on analysis of the image and/or a projection of a cuboid representing a 3D bounding volume for the car onto the image.

Because the prelabel represents a prediction of bounding box 502 for the car by the machine learning model, the initialization of bounding box 502 with the prelabel improves the accuracy of the user's labeling of bounding box 502 and/or reduces time and/or effort required of the user to generate the labeling. For example, the prelabel may be displayed at the beginning of the user's labeling task, which involves specifying bounding boxes for the car and/or other objects in a series of video frames that includes the image shown in FIG. 5. The user may interact with tools provided by user interface 402 to verify the accuracy of bounding box 502 in the image (e.g., by zooming in to various portions of the image) and/or adjust the boundaries of bounding box 502 (e.g., by dragging the edges and/or corners of bounding box 502). Additional bounding boxes for the car in other images (e.g., additional video frames in the same sequence as the image shown in FIG. 5) may also be initialized with prelabels for the bounding boxes to further expedite the user's labeling of the bounding boxes instead of requiring the user to manually create, drag, resize, and/or otherwise manipulate a bounding box for each instance of the car in the images.

Figure 6:
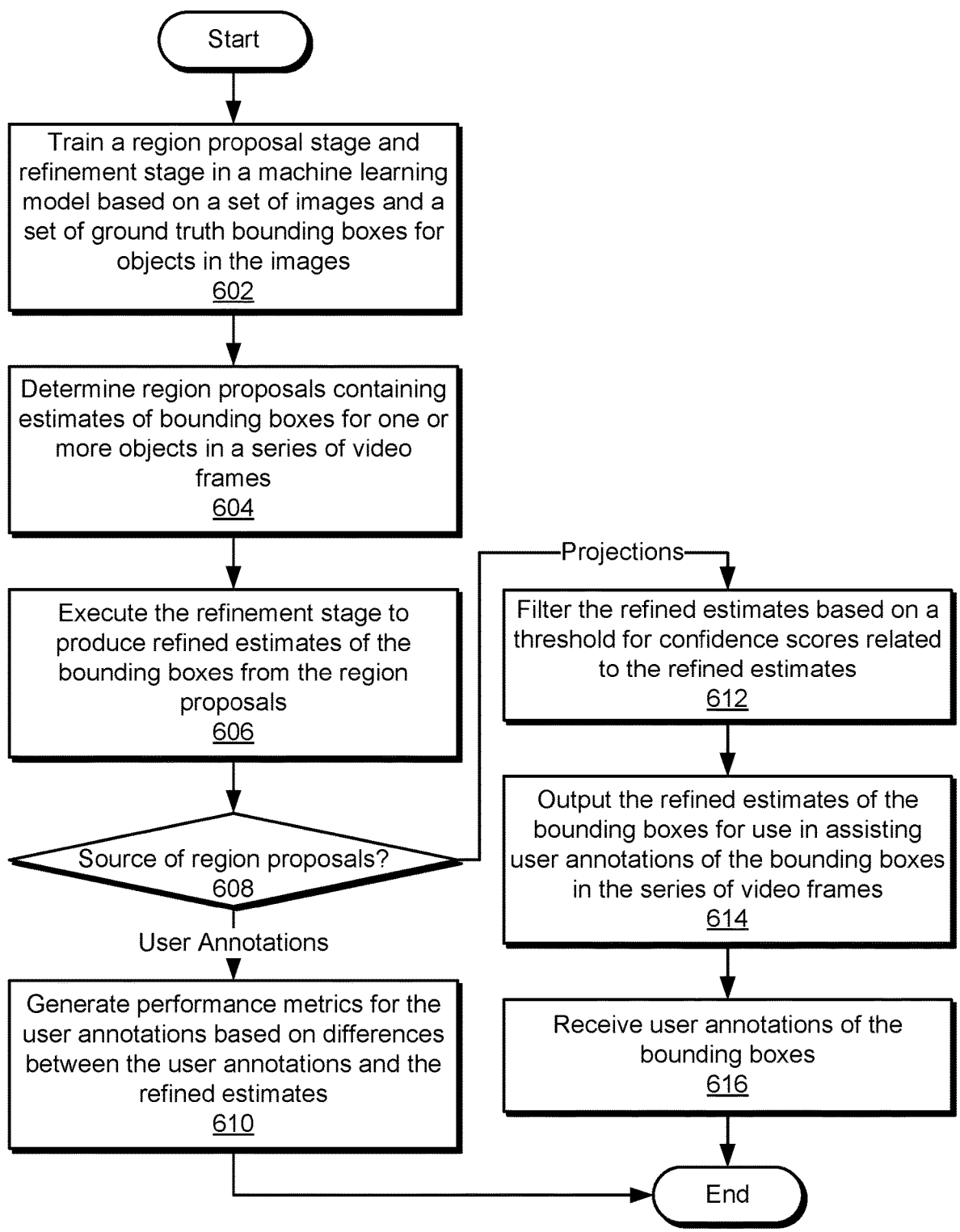
FIG. 6 is a flow chart of method steps for performing a labeling task, according to various embodiments.

FIG. 6 is a flow chart of method steps for assisting a labeling task, according to various embodiments. Although the method steps are described with reference to the system of FIGS. 1 and 3, persons skilled in the art will understand that any system may be configured to implement the method steps, in any order, in other embodiments.

As shown, server 130 trains 602 a region proposal stage and refinement stage in a machine learning model based on a set of images and a set of ground truth bounding boxes for objects in the image. For example, the machine learning model includes one or more portions of a Faster R-CNN architecture. The images are inputted into a number of convolutional layers in the Faster R-CNN architecture, and feature maps outputted by the convolutional layers are inputted into the region proposal stage to produce region proposals and "objectness" scores for the region proposals. The feature maps and region proposals are then fed into the refinement stage to produce refined proposals and confidence scores representing probabilities that the refined proposals contain different classes of objects. Stochastic gradient descent and backpropagation are then performed on parameters of the region proposal stage to reduce errors between the proposals and ground truth bounding boxes and errors between the objectness scores and labels associated with the region proposals. Similarly, stochastic gradient descent and backpropagation are performed on parameters of the refinement stage to reduce errors between the refined proposals and ground truth bounding boxes and errors between the confidence scores and labels denoting the true classes of objects within the ground truth bounding boxes.

Next, server 130 and/or client device 102 determine 604 region proposals containing estimates of bounding boxes for one or more objects in a series of video frames. For example, 3D points in a cuboid bounding each object are projected onto 2D points in video frames in which the object appears based on parameters related to capture of the video frames by a camera. The parameters include, but are not limited to, a camera position, camera orientation, camera skew, radial distortion coefficient, and/or tangential distortion coefficient. Region proposals for the object are then obtained as minimum bounding boxes for the 2D points in the video frames. In another example, the region proposals are obtained as user annotations of the bounding boxes for the object(s) in the video frames (e.g., after the user annotations are submitted at the conclusion of a labeling task).

Server 130 and/or client device 102 then execute 606 the refinement stage to produce refined estimates of the bounding boxes from the region proposals. For example, feature maps generated by the convolutional layers from the region proposals are inputted into the refinement stage, and the refinement stage outputs the refined estimates and confidence scores related to the refined estimates.

Server 130 and/or client device 102 subsequently perform processing based on the source 608 of the region proposals. If the region proposals are obtained from user annotations of the bounding boxes, server 130 and/or client device 102 generate 610 performance metrics for the user annotations based on differences between the user annotations and the refined estimates. For example, server 130 and/or client device 102 calculate IoUs between the user annotations and corresponding refined estimates. Server 130 and/or client device 102 then determine scores and/or ratings representing the accuracy of the user annotations based on comparisons of the IoUs with one or more thresholds. Server 130 and/or client device 102 additionally reject user annotations associated with IoUs that fall below a minimum threshold (e.g., 0.8).

If the region proposals are obtained from projections of cuboids onto the video frames, server 130 and/or client device 102 filter 612 the refined estimates based on a threshold for confidence scores related to the refined estimates. For example, server 130 and/or client device 102 obtain a set of prelabels for objects to be annotated in the labeling task as refined estimates with confidence scores that exceed a numeric or quantile threshold.

Client device 102 then outputs 614 the refined estimates of the bounding boxes for use in assisting user annotations of the bounding boxes in the series of video frames. Continuing with the above example, client device 102 displays the prelabels as initial representations of bounding boxes over the series of video frames. Client device 102 also generates user-interface elements or tools for adjusting the bounding boxes in the video frames. A user may interact with the user-interface elements or tools to create, delete, adjust, and/or otherwise manipulate the bounding boxes in the video frames.

Client device 102 additionally receives 616 user annotations of the bounding boxes. For example, client device 102 obtains a set of user annotations of the bounding boxes after a user confirms that the user annotations are complete (e.g., using one or more user-interface elements generated by client device 102). Server 130 may then input the user annotations as additional region proposals into the machine learning model and use refined estimates of the bounding boxes outputted by the machine learning model to evaluate the accuracy of the user annotations, as described above.

Figure 7:
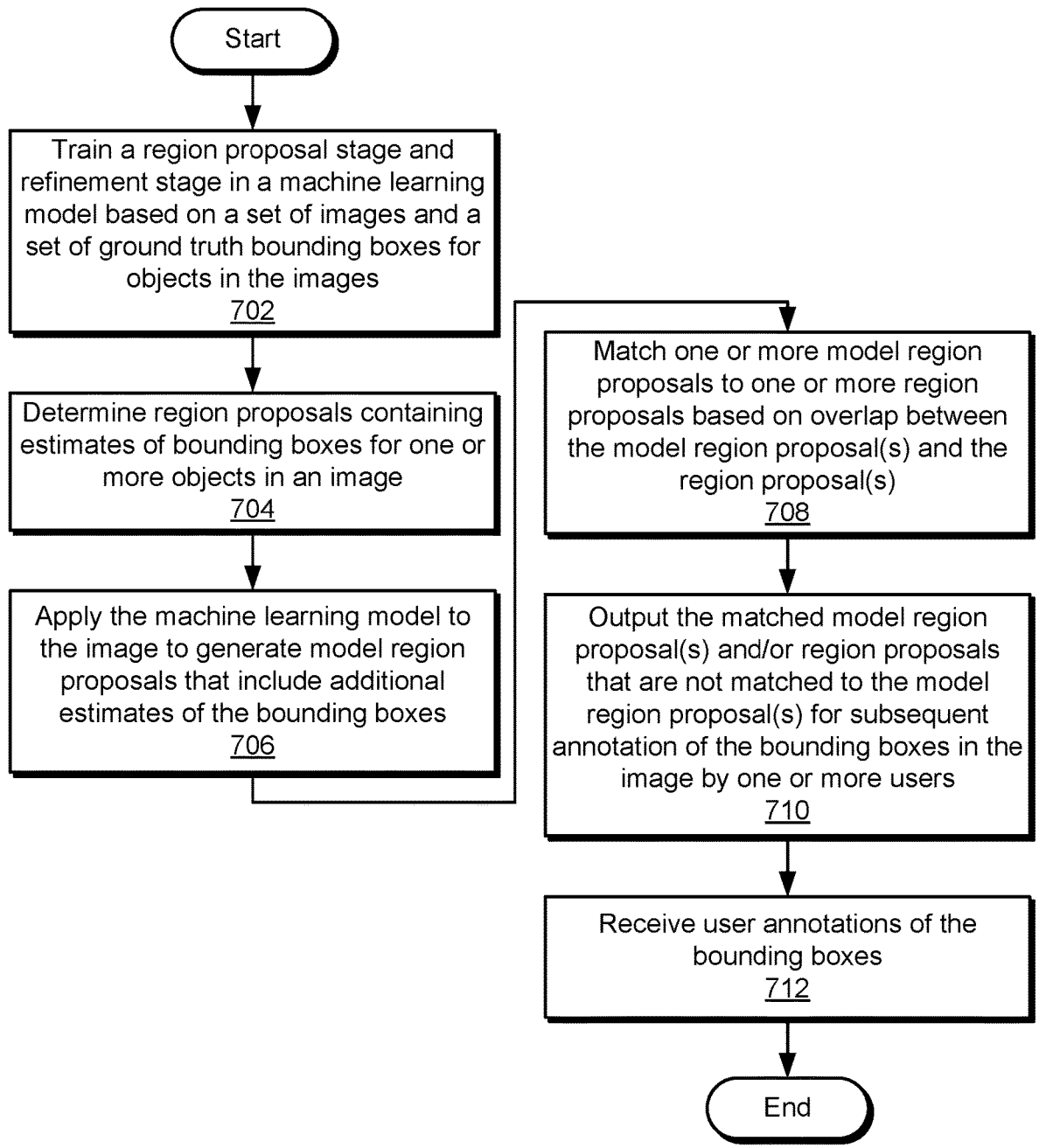
FIG. 7 is a flow chart of method steps for performing a labeling task, according to various embodiments.

FIG. 7 is a flow chart of method steps for assisting a labeling task, according to various embodiments. Although the method steps are described with reference to the system of FIGS. 1 and 3, persons skilled in the art will understand that any system may be configured to implement the method steps, in any order, in other embodiments.

As shown, server 130 trains 702 a region proposal stage and refinement stage in a machine learning model based on a set of images and a set of ground truth bounding boxes for objects in the image. Next, server 130 and/or client device 102 determine 704 region proposals containing estimates of bounding boxes for one or more objects in an image. As mentioned above, the machine learning model may include a Faster R-CNN architecture, and the region proposals may be generated by projecting 3D points in a cuboid bounding each object onto 2D points in the image appears based on parameters related to capture of the image by a camera.

Server 130 and/or client device 102 apply 706 the machine learning model to the image to generate model region proposals that include additional estimates of the bounding boxes. For example, server 130 and/or client device 102 may use the region proposal and refinement stages of the Faster R-CNN architecture to process the image (without the projection-based region proposals) and obtain model region proposals as predictions of bounding boxes for one or more objects in the image.

Server 130 and/or client device 102 match 708 one or more model region proposals to one or more region proposals based on overlap between the model region proposal(s) and region proposal(s). For example, server 130 and/or client device 102 may match a model region proposal to one or more projection-based region proposals that have an IoU of greater than 0.5 (or another threshold) with the model region proposal. When multiple projection-based region proposals meet the IoU threshold for the model region proposal, the projection-based region proposal with the highest IoU is selected as a match for the model region proposal.

Client device 102 then outputs 710 the matched model region proposal(s) and/or region proposals that are not matched to the model region proposal(s) for subsequent annotation of the bounding boxes in the image by one or more users. For example, client device 102 may output, as "prelabels" for bounding boxes in the image, any model region proposals from the machine learning model that are matched to projection-based region proposals. Client device 102 may also output, as additional prelabels for the bounding boxes, any projection-based region proposals that are not matched to the model region proposals.

Client device 102 also receives 712 user annotations of the bounding boxes. For example, client device 102 displays the model region proposal(s) as prelabels representing initial representations of bounding boxes for objects in the image. Client device 102 also generates user-interface elements or tools for adjusting the bounding boxes in the video frames. A user may interact with the user-interface elements or tools to create, delete, adjust, and/or otherwise manipulate the bounding boxes in the video frames and confirm that the user annotations are complete.

In sum, the disclosed embodiments expedite user labeling of bounding boxes for objects in video frames and/or other images by generating "prelabels" representing estimates of the bounding boxes. The prelabels are generated by region proposal and/or refinement stages of a machine learning model based on analysis of the video frames and/or projections of 3D cuboids bounding the objects onto the images. The prelabels are outputted with the images within a user interface to one or more users, and the user(s) interact with tools provided by the user interface to confirm, change, add, and/or remove the bounding boxes and/or labels related to the bounding boxes.

One technological advantage of the disclosed techniques is that users are able to label bounding boxes and/or object classes in the images more quickly than conventional techniques that require users to manually specify bounding boxes and/or class labels for all objects in an image. Because the amount of user input or time required to label the bounding boxes and/or object classes is reduced, processing time and/or resource consumption by servers, client devices, and/or applications that provide user interfaces or tools for performing user labeling of the images are also reduced. In turn, machine learning models that are trained or validated using the labels have better performance and/or faster convergence than machine learning models that are trained or validated using noisy and/or inaccurate labels. Another advantage of the disclosed techniques includes omitting the region proposal stage of the machine learning model in generating the prelabels, which improves the latency and/or resource overhead in executing the machine learning model over conventional techniques that involve executing both region detection and refinement stages of object detection networks to produce bounding boxes for objects in images. Consequently, the disclosed techniques provide technological improvements in generating labeled data for machine learning; determining bounding boxes and/or object classes for objects in images; and/or training, validating, and executing machine learning models.

1. In some embodiments, a method for performing a labeling task comprises determining one or more region proposals, wherein each region proposal included in the one or more region proposals includes estimates of one or more bounding boxes surrounding one or more objects in a plurality of video frames; performing one or more operations that execute a refinement stage of a machine learning model to produce one or more refined estimates of the one or more bounding boxes included in the one or more region proposals; and outputting the one or more refined estimates as initial representations of the one more bounding boxes for subsequent annotation of the one or more bounding boxes by one or more users.

2. The method of clause 1, further comprising training a region proposal stage and the refinement stage in the machine learning model based on a set of images and a set of ground truth bounding boxes for objects in the set of images.

3. The method of any of clauses 1-2, further comprising filtering the one or more refined estimates based on a threshold for confidence scores related to the one or more refined estimates prior to outputting the one or more refined estimates.

4. The method of any of clauses 1-3, wherein determining the one or more region proposals comprises projecting three-dimensional (3D) points in a cuboid bounding an object onto two-dimensional (2D) points in the plurality of video frames based on parameters related to capture of the plurality of video frames by a camera.

5. The method of any of clauses 1-4, wherein determining the one or more region proposals further comprises generating a region proposal for the object as a minimum bounding box for the 2D points in each of the video frames.

6. The method of any of clauses 1-5, wherein the parameters comprise a camera position and a camera orientation.

7. The method of any of clauses 1-6, wherein the parameters comprise at least one of a camera skew, a radial distortion coefficient, and a tangential distortion coefficient.

8. The method of any of clauses 1-7, wherein determining the one or more region proposals comprises obtaining the one or more region proposals as one or more user annotations of the one or more bounding boxes.

9. The method of any of clauses 1-8, further comprising generating performance metrics for the one or more user annotations based on differences between the user annotations one or more and the one or more refined estimates.

10. The method of any of clauses 1-9, wherein generating the performance metrics comprises calculating an intersection over union (IoU) between a user annotation of a bounding box and a refined estimate of the bounding box generated by the machine learning model from the user annotation.

11. The method of any of clauses 1-10, wherein determining the one or more region proposals comprises executing a region proposal stage of the machine learning model to produce the one or more region proposals from the series of video frames.

12. The method of any of clauses 1-11, wherein outputting the one or more refined estimates comprises displaying the one or more refined estimates as initial representations of the one or more bounding boxes over the series of video frames; and generating user-interface elements for adjusting the one or more bounding boxes in the series of video frames.

13. In some embodiments, a non-transitory computer readable medium storing instructions that, when executed by a processor, cause the processor to perform the steps of determining one or more region proposals, wherein each region proposal included in the one or more region proposals includes estimates of one or more bounding boxes surrounding one or more objects in a plurality of video frames; performing one or more operations that execute a refinement stage of a machine learning model to produce one or more refined estimates of the one or more bounding boxes included in the one or more region proposals; and outputting the one or more refined estimates as initial representations of the one more bounding boxes for subsequent annotation of the one or more bounding boxes by one or more users.

14. The non-transitory computer readable medium of clause 13, wherein the steps further comprise filtering the one or more refined estimates based on a threshold for confidence scores related to the one or more refined estimates prior to outputting the one or more refined estimates.

15. The non-transitory computer readable medium of any of clauses 13-14, wherein determining the one or more region proposals comprises projecting three-dimensional (3D) points in a cuboid bounding an object onto two-dimensional (2D) points in the series of video frames based on parameters related to capture of the series of video frames by a camera; and generating a region proposal for the object as a minimum bounding box for the 2D points in each of the video frames.

16. The non-transitory computer readable medium of any of clauses 13-15, wherein determining the one or more region proposals comprises obtaining the one or more region proposals as one or more user annotations of the bounding boxes 17. The non-transitory computer readable medium of any of clauses 13-16, wherein the steps further comprise generating performance metrics for the one or more user annotations based on differences between the one or more user annotations and the one or more refined estimates.

18. The non-transitory computer readable medium of any of clauses 13-17, wherein generating the performance metrics comprises calculating an intersection over union (IoU) between a user annotation of a bounding box and a refined estimate of the bounding box generated by the machine learning model from the user annotation; and when the IoU falls below a threshold, rejecting the user annotation of the bounding box.

19. The non-transitory computer readable medium of any of clauses 13-18, wherein outputting the one or more refined estimates comprises displaying the one or more refined estimates as initial representations of the one or more bounding boxes over the series of video frames; and generating user-interface elements for adjusting the one or more bounding boxes in the series of video frames.

20. In some embodiments, a system comprises a memory that stores instructions, and a processor that is coupled to the memory and, when executing the instructions, is configured to determine one or more region proposals, wherein each region proposal included in the one or more region proposals includes estimates of one or more bounding boxes surrounding one or more objects in a plurality of video frames; perform one or more operations that execute a refinement stage of a machine learning model to produce one or more refined estimates of the one or more bounding boxes included in the one or more region proposals; and output the one or more refined estimates as initial representations of the one more bounding boxes for subsequent annotation of the one or more bounding boxes by one or more users.

21. In some embodiments, a method for performing a labeling task comprises determining one or more region proposals comprising estimates of one or more bounding boxes surrounding one or more objects in an image; applying a machine learning model to the image to generate one or more model region proposals comprising additional estimates of the one or more bounding boxes for the image; and upon matching a first model region proposal in the one or more model region proposals with a first region proposal in the one or more region proposals based on an overlap between the first region proposal and the first model region proposal, outputting the first model region proposal as an initial representation of a first bounding box in the image for subsequent annotation of the first bounding box by one or more users.

22. The method of clause 21, further comprising when a second region proposal in the one or more region proposals is not matched with a second model region proposal in the one or more region proposals, outputting the second region proposal as the initial representation of a second bounding box in the image.

23. The method of any of clauses 21-22, wherein matching the first region proposal with the first model region proposal comprises at least one of applying a threshold to an intersection over union (IoU) between the first region proposal and the first model region proposal and maximizing an overall IoU between the one or more model region proposals and the one or more region proposals.

24. The method of any of clauses 21-23, wherein determining the one or more region proposals comprises projecting three-dimensional (3D) points in a cuboid bounding an object onto two-dimensional (2D) points in the image based on parameters related to capture of the image by a camera; and generating a region proposal for the object as a minimum bounding box for the 2D points in the image.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A method for performing a labeling task, comprising:
determining one or more region proposals comprising estimates of one or more bounding boxes surrounding one or more objects in an image, wherein determining the one or more region proposals comprises projecting three-dimensional (3D) points in a cuboid bounding an object onto two-dimensional (2D) points in the image based on parameters related to capture of the image by a camera;
applying a machine learning model to the image to generate one or more model region proposals comprising additional estimates of the one or more bounding boxes for the image; and
upon matching a first model region proposal in the one or more model region proposals with a first region proposal in the one or more region proposals based on an overlap between the first region proposal and the first model region proposal, outputting the first model region proposal as an initial representation of a first bounding box in the image for subsequent annotation of the first bounding box by one or more users.

2. The method of claim 1, further comprising when a second region proposal in the one or more region proposals is not matched with a second model region proposal in the one or more region proposals, outputting the second region proposal as the initial representation of a second bounding box in the image.

3. The method of claim 1, wherein matching the first region proposal with the first model region proposal comprises at least one of applying a threshold to an intersection over union (IoU) between the first region proposal and the first model region proposal and maximizing an overall IoU between the one or more model region proposals and the one or more region proposals.

4. The method of claim 1, wherein determining the one or more region proposals comprises:
generating a region proposal for the object as a minimum bounding box for the 2D points in the image.

5. The method of claim 1, wherein the parameters comprise a camera position and a camera orientation.

6. The method of claim 1, wherein the parameters comprise at least one of a camera skew, a radial distortion coefficient, and a tangential distortion coefficient.

7. The method of claim 1, wherein determining the one or more region proposals comprises obtaining the one or more region proposals as one or more user annotations of the one or more bounding boxes.

8. The method of claim 7, further comprising generating performance metrics for the one or more user annotations based on differences between the user annotations one or more and the one or more model region proposals.

9. The method of claim 1, wherein outputting the first model region proposal comprises generating user-interface elements for adjusting the one or more bounding boxes in the image.

10. One or more non-transitory computer readable media storing instructions that, when executed by one or more processors, cause the one or more processors to perform the steps of:
determining one or more region proposals comprising estimates of one or more bounding boxes surrounding one or more objects in an image, wherein determining the one or more region proposals comprises projecting three-dimensional (3D) points in a cuboid bounding an object onto two-dimensional (2D) points in the image based on parameters related to capture of the image by a camera;
applying a machine learning model to the image to generate one or more model region proposals comprising additional estimates of the one or more bounding boxes for the image; and
upon matching a first model region proposal in the one or more model region proposals with a first region proposal in the one or more region proposals based on an overlap between the first region proposal and the first model region proposal, outputting the first model region proposal as an initial representation of a first bounding box in the image for subsequent annotation of the first bounding box by one or more users.

11. The one or more non-transitory computer readable media of claim 10, further comprising when a second region proposal in the one or more region proposals is not matched with a second model region proposal in the one or more region proposals, outputting the second region proposal as the initial representation of a second bounding box in the image.

12. The one or more non-transitory computer readable media of claim 10, wherein matching the first region proposal with the first model region proposal comprises at least one of applying a threshold to an intersection over union (IoU) between the first region proposal and the first model region proposal and maximizing an overall IoU between the one or more model region proposals and the one or more region proposals.

13. The one or more non-transitory computer readable media of claim 10, wherein determining the one or more region proposals comprises: generating a region proposal for the object as a minimum bounding box for the 2D points in the image.

14. The one or more non-transitory computer readable media of claim 10, wherein the parameters comprise a camera position and a camera orientation.

15. The one or more non-transitory computer readable media of claim 10, wherein the parameters comprise at least one of a camera skew, a radial distortion coefficient, and a tangential distortion coefficient.

16. The one or more non-transitory computer readable media of claim 10, wherein determining the one or more region proposals comprises obtaining the one or more region proposals as one or more user annotations of the one or more bounding boxes.

17. The one or more non-transitory computer readable media of claim 16, further comprising generating performance metrics for the one or more user annotations based on differences between the user annotations one or more and the one or more model region proposals.

18. The one or more non-transitory computer readable media of claim 10, wherein outputting the first model region proposal comprises generating user-interface elements for adjusting the one or more bounding boxes in the image.

19. A system, comprising:
   one or more memories storing instructions; and
   one or more computing devices that execute the instructions to:
      determine one or more region proposals comprising estimates of one or more bounding boxes surrounding one or more objects in an image, wherein determining the one or more region proposals comprises projecting three-dimensional (3D) points in a cuboid bounding an object onto two-dimensional (2D) points in the image based on parameters related to capture of the image by a camera;
      apply a machine learning model to the image to generate one or more model region proposals comprising additional estimates of the one or more bounding boxes for the image; and
      upon matching a first model region proposal in the one or more model region proposals with a first region proposal in the one or more region proposals based on an overlap between the first region proposal and the first model region proposal, output the first model region proposal as an initial representation of a first bounding box in the image for subsequent annotation of the first bounding box by one or more users.

20. The system of claim 19, further comprising when a second region proposal in the one or more region proposals is not matched with a second model region proposal in the one or more region proposals, outputting the second region proposal as the initial representation of a second bounding box in the image.

\* \* \* \* \*